United States Patent
Clark et al.

(10) Patent No.: US 8,074,041 B2
(45) Date of Patent: Dec. 6, 2011

(54) APPARATUS, SYSTEM, AND METHOD FOR MANAGING STORAGE SPACE ALLOCATION

(75) Inventors: Thomas Keith Clark, Gresham, OR (US); Ramakrishna Dwivedula, San Jose, CA (US); Roger C. Raphael, San Jose, CA (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 11/008,316

(22) Filed: Dec. 9, 2004

(65) Prior Publication Data

US 2006/0129778 A1 Jun. 15, 2006

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 15/16* (2006.01)
*G06F 17/30* (2006.01)

(52) U.S. Cl. ........ 711/170; 711/147; 711/153; 711/204; 709/203; 709/217; 709/229; 707/821

(58) Field of Classification Search .................. 711/147, 711/153, 170, 204; 709/203, 217, 229; 707/821
See application file for complete search history.

(56) References Cited

U.S. PATENT DOCUMENTS

| | | | | |
|---|---|---|---|---|
| 5,226,159 A * | 7/1993 | Henson et al. | | 707/8 |
| 5,734,898 A * | 3/1998 | He | | 707/203 |
| 6,324,581 B1 * | 11/2001 | Xu et al. | | 709/229 |
| 6,404,676 B2 | 6/2002 | Kihara et al. | | 365/185.12 |
| 6,405,201 B1 | 6/2002 | Nazari | | 707/8 |
| 6,629,111 B1 | 9/2003 | Stine et al. | | 707/205 |
| 6,820,122 B1 * | 11/2004 | Mandler et al. | | 709/226 |
| 2003/0191745 A1 * | 10/2003 | Jiang et al. | | 707/2 |
| 2004/0062518 A1 | 4/2004 | McNeal et al. | | 386/46 |
| 2005/0193128 A1 * | 9/2005 | Dawson et al. | | 709/229 |

* cited by examiner

*Primary Examiner* — Michael Alsip
(74) *Attorney, Agent, or Firm* — Kunzler Needham Massey & Thorpe

(57) ABSTRACT

An apparatus, system, and method are disclosed for managing storage space allocation. The apparatus includes a recognizing module, a reserving module, and a managing module. The recognizing module recognizes a trigger event at a client of the data storage system. The reserving module reserves logical units of space for data storage. The management module manages the logical units of space at the client. Such an arrangement provides for distributed management of storage space allocation within a storage area network (SAN). Facilitating client management of the logical units of space in this manner may reduce the number of required metadata transactions between the client and a metadata server and may increase performance of the SAN file system. Reducing metadata transactions effectively lowers network overhead, while increasing data throughput.

15 Claims, 9 Drawing Sheets

APPARATUS, SYSTEM, AND METHOD FOR MANAGING STORAGE SPACE ALLOCATION

BACKGROUND OF THE INVENTION

1. Field of the Invention

This invention relates to data storage and more particularly relates to managing storage space allocation.

2. Description of the Related Art

Typical Storage Area Network (SAN) based file systems include a client and a metadata server. Generally, both the client and the metadata server are connected to the SAN. FIG. 1 is a schematic block diagram illustrating a common SAN file system configuration. The system includes a client, a metadata server, a SAN, and associated storage mediums. These components are typically connected by an IP network. In some instances, the client and the metadata server are integrated into the SAN. The client and the metadata server often perform direct metadata transactions aside from common data transactions within the SAN.

The metadata server is generally responsible for managing the allocation of storage space in the SAN, while the client services the user. A user is an application hosted by the client, a human user, or the like. The client requests that the metadata server allocate storage space on the SAN to store user data. The client then makes data transactions directly with the SAN in the space designated by the metadata server. Metadata transactions between the client and the metadata server often take place directly, aside from standard SAN data transfer transactions. However, metadata transactions may significantly increase usage of client resources, server resources, and network resources. Consequently, transaction latency and system resource costs may reduce the observed write throughput of user applications and may reduce overall performance of the SAN file system.

Generally, physical storage space within a SAN is divided into blocks. A block of space is the smallest unit allocated in a SAN environment. A block of space may contain multiple bits of information. In a SAN environment, blocks of storage space may be allocated to files for data storage. In a typical SAN environment, however, these blocks are still managed completely by the metadata server. A logical representation of the described units of allocated physical storage space is hereinafter referred to as a logical unit of space.

FIG. 2 is a schematic state diagram illustrating the life-cycle of logical units of space in a conventional SAN environment. The life-cycle of a unit of space generally includes two states: unallocated and allocated to file. A unit of space transitions from the unallocated state to the allocated state when a file is created or extended. If a file is deleted or truncated, the unit of space moves back to the unallocated state. Once returned to the unallocated state, the space may be allocated to new files. One problem associated with this arrangement is that the metadata server completely controls every phase of the life cycle. A metadata transaction between the metadata server and the client takes place each time a file is created or extended and each time a file is deleted or truncated. In a SAN environment, the large number of metadata transactions over the IP network required to create and delete files may reduce the overall performance of the system.

From the foregoing discussion, it should be apparent that a need exists for an apparatus, system, and method that manage storage space allocation. Beneficially, such an apparatus, system, and method would reduce the number of metadata transactions required to store and delete data in a data storage environment, while maintaining an accurate record of the status of the managed storage space.

SUMMARY OF THE INVENTION

The present invention has been developed in response to the present state of the art, and in particular, in response to the problems and needs in the art that have not yet been fully solved by currently available storage space management solutions. Accordingly, the present invention has been developed to provide an apparatus, system, and method for managing storage space allocation that overcome many or all of the above-discussed shortcomings in the art.

The apparatus to manage storage space allocation is provided with a logic unit containing a plurality of modules configured to functionally execute the necessary operations to recognize a trigger event at a client, reserve space to store data using a logical unit of space in response to the trigger event, and manage the logical units of space at the client. These modules in the described embodiments include a recognizing module, a reserving module, and a managing module.

The reserving module reserves space to store data using logical units of space in response to a trigger event. Reserving may additionally include reclaiming logical units of space to be managed by the client in response to deletion of data. In one embodiment, the reserving module includes a pre-fetch module. The pre-fetch module requests access to storage space from a metadata server prior to receiving a request for space to store data. The reserving module may also include a requesting module. The requesting module requests logical units of space from a metadata server or another client.

The apparatus is further configured, in one embodiment, to manage the logical units of space at the client. The logical units of space managed by the client are associated with physical units of storage space managed by a metadata server. In one embodiment, the apparatus also includes a returning module. The returning module returns logical units of space to the metadata server responsive to a return request from the metadata server. In a further embodiment, the apparatus includes a communication module. The communication module communicates to a metadata server the state of each logical unit of space distributed to the client, thereby ensuring that logical units of space are not lost.

A system of the present invention is also presented to manage storage space allocation. The system may include a storage medium, a metadata server, and a client. The storage medium stores data. In one embodiment, the metadata server manages physical storage space on the storage medium. Additionally, the client recognizes a trigger event at the client, reserves space to store data using a logical unit of space in response to the trigger event, and manages the logical unit of space. In one embodiment, the logical unit of space managed by the client is associated with the physical storage space managed by a metadata server.

In a further embodiment, the system may include a client configured to manage storage space allocation. In one embodiment, the client includes a recognize module, a reserve module, and a manage module. The recognize module recognizes a trigger event. The reserve module reserves space to store data using a logical unit of space in response to the trigger event. The manage module manages the logical unit of space.

Additionally, the system may include a metadata server configured to delegate management of storage space. In one embodiment, the metadata server includes a receive module, an allocate module, and a track module. The receive module receives a request for a logical unit of space from a client. In one embodiment, the allocate module allocates the logical unit of space to the client. The track module may track client activities involving the logical unit of space.

A method of the present invention is also presented for managing storage space allocation. The method in the disclosed embodiments substantially includes the operations necessary to carry out the functions presented above with respect to the operation of the described apparatus and system. In one embodiment, the method includes recognizing a trigger event, reserving space to store data using a logical unit of space in response to the trigger event, and managing the logical units of space at the client.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
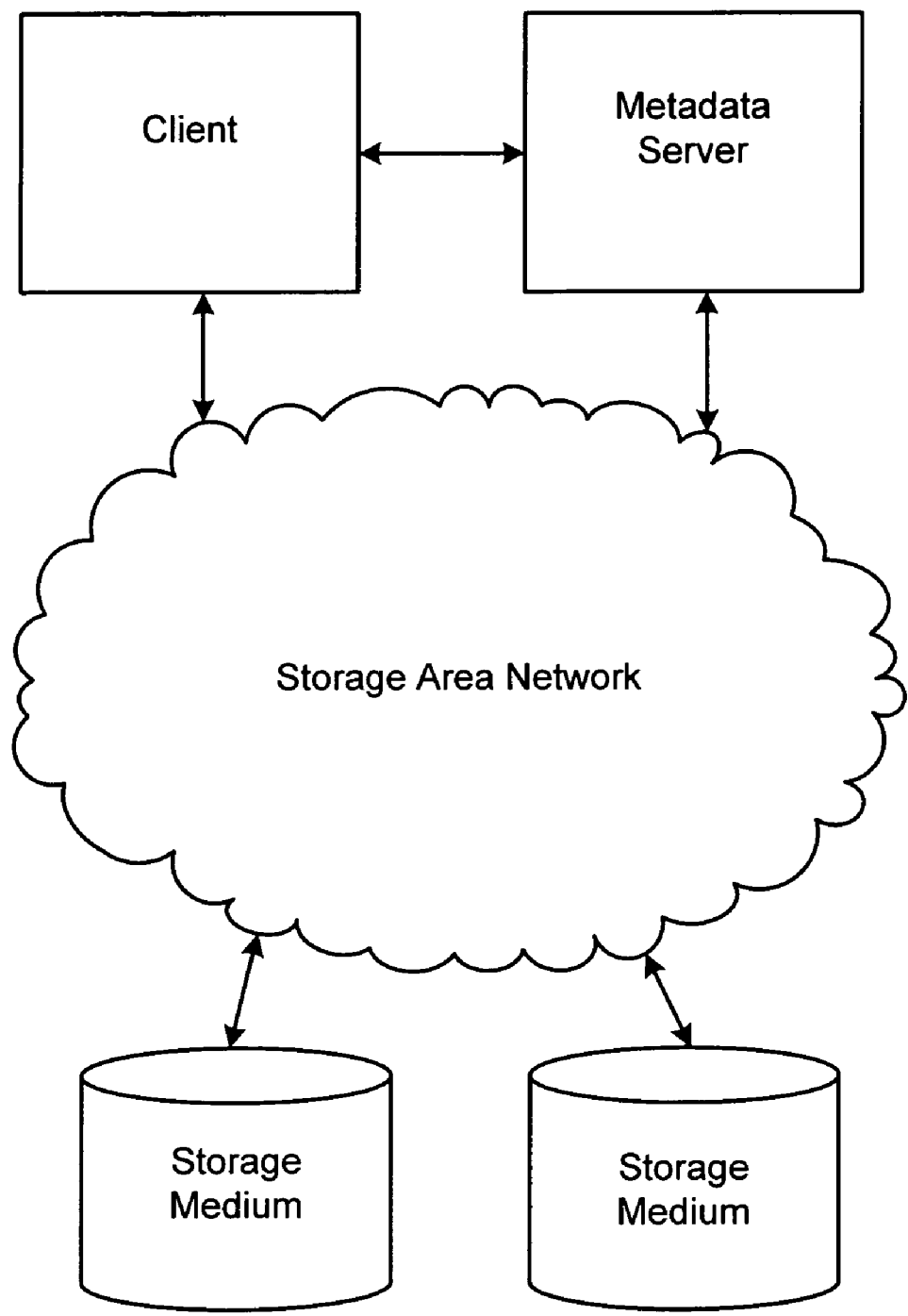
FIG. 1 is a schematic block diagram illustrating a common SAN file system configuration.
Figure 2:
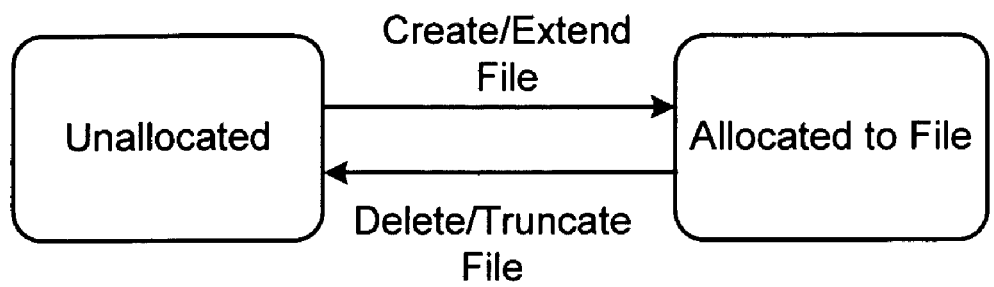
FIG. 2 is a schematic state diagram illustrating a conventional life-cycle of a logical unit of space in a data storage environment.
Figure 3:
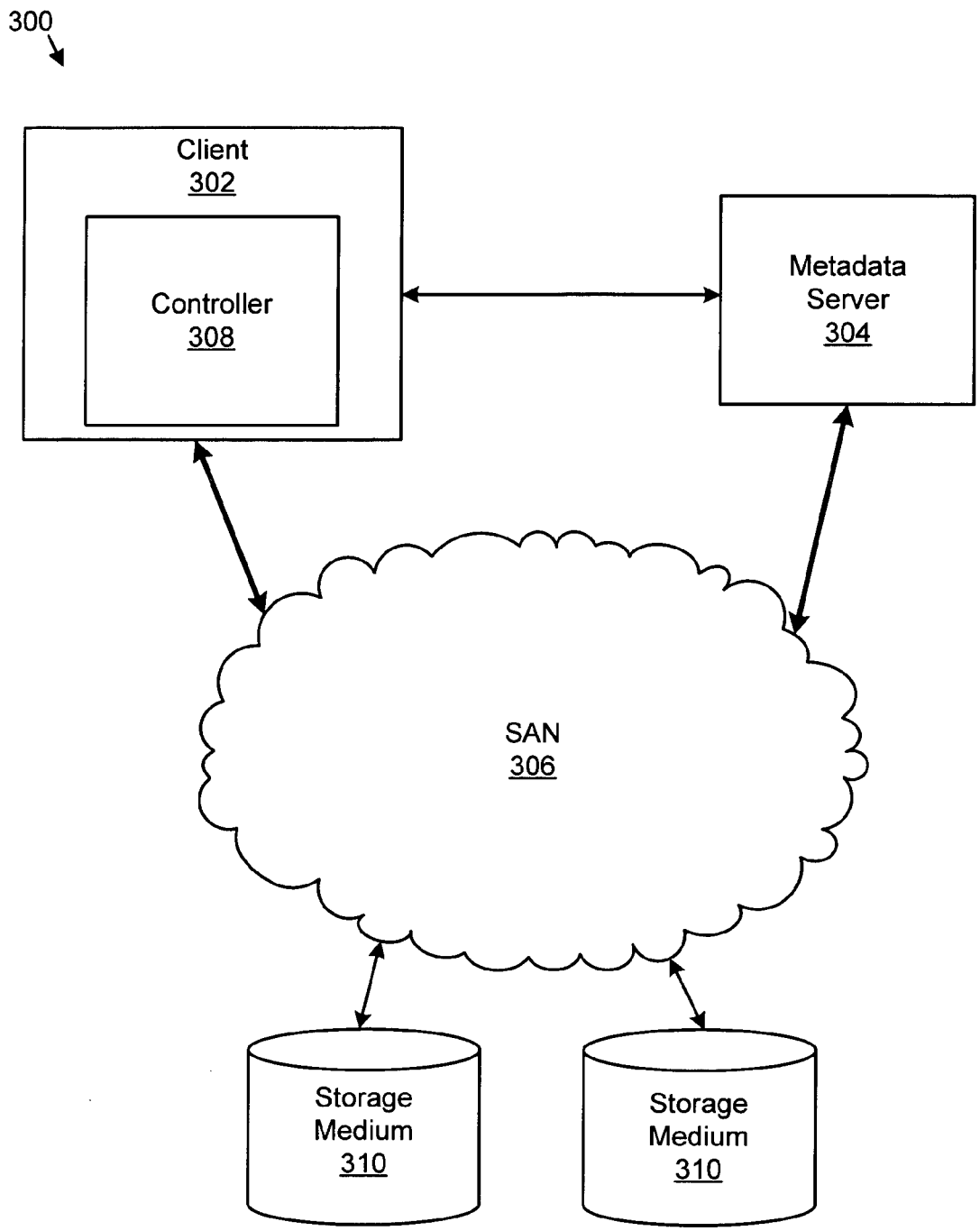
FIG. 3 is a schematic block diagram illustrating one embodiment of a data storage system.

FIG. 3 depicts one embodiment of a data storage system 300. The illustrated storage system 300 includes a client 302, a metadata server 304, and a SAN 306 including one or more associated storage mediums 310. In one embodiment, the system 300 further includes controller 308. In certain embodiments, the controller 308 is located on the client 302. Alternatively, the controller 308 or its equivalent may be located on the metadata server 304. In various embodiments, the controller 308 may be embodied as an apparatus to manage storage space allocation. Further possible embodiments of such an apparatus are described in more detail with reference to FIG. 3 through FIG. 5 below. In one embodiment, the metadata server 304 delegates management of a group of the logical units of space to the client 302. In such an embodiment, the number of metadata transactions between the client 302 and the metadata server 304 may be greatly reduced.

In one embodiment, the system 300 may include multiple clients 302, each client 302 being in communication with both the metadata server 304 and the SAN 306. Communications may also exist directly between the clients 302. In one embodiment, the clients 302 may request a transfer of logical units of space from one client 302 to another client 302.

In certain embodiments, the metadata server 304 and the client 302 are integrated with the SAN 306 via a network connection. The client 302 may additionally communicate directly with the metadata server 304 via the controller 308. In one embodiment, an IP data connection is used to communicate transactions between the client 302 and the metadata server 304. Alternatively the client 302 and the metadata server 304 may perform metadata transactions via another data connection such as a direct serial connection, wireless connection, or the like. In such embodiments, the metadata transactions between the client 302 and the metadata server 304 occur on a data connection separate from the data transaction connection of the SAN 306. Some metadata transactions may include create file, synchronize file metadata, allocate space to file, delete file, and the like.

The system 300, in one embodiment, may include a storage medium other than a SAN 306. In one embodiment, the client 302 and the metadata server 304 may communicate with a redundant storage disk array system. Alternatively, the SAN 306 may be replaced with a tape drive, memory device, hard disk, or the like. In such embodiments, the logical units of space are associated with physical storage space on the storage medium. In one embodiment, the metadata server 304 may also be included in the SAN 306.

As used herein, the term logical unit of space refers to a logical construct associated with a physical space on the storage medium 310. In one embodiment, the logical units are created by the metadata server 304 and assigned to the client 302 for remote management. In such an embodiment, the client 302 retains control of allocation and reclaiming of the logical unit. The logical units may be associated with blocks, extents, or other units of physical storage space.

Figure 4:
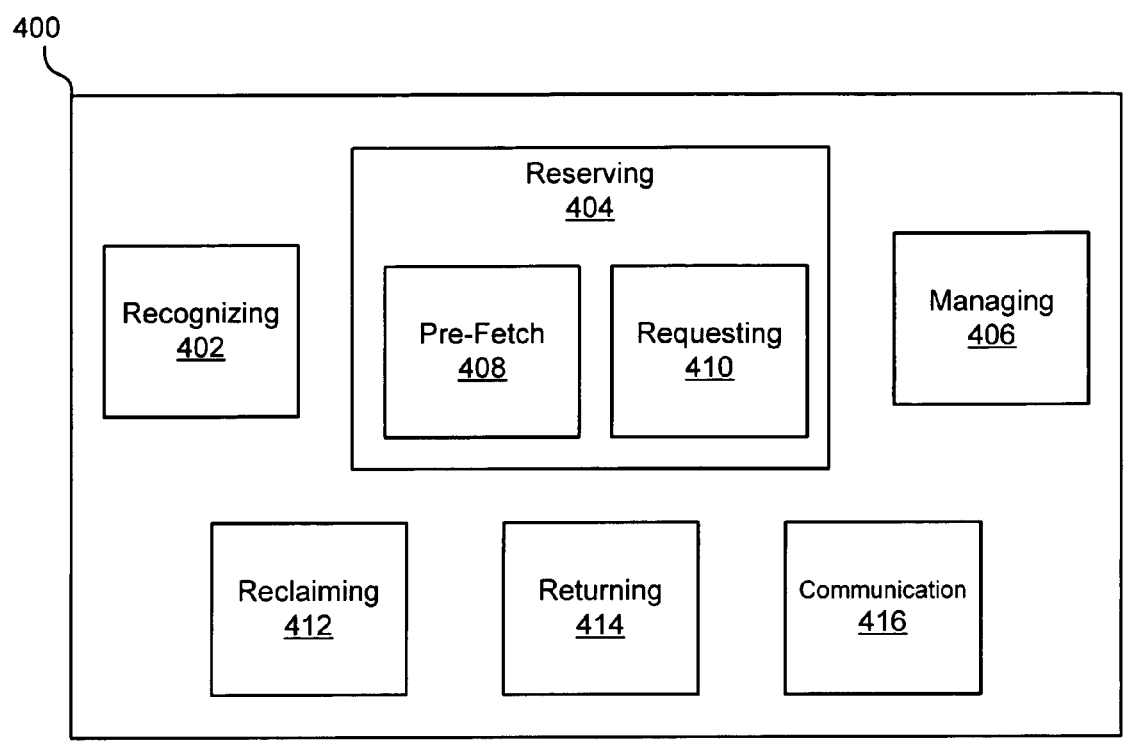
FIG. 4 is a schematic block diagram illustrating one embodiment of an apparatus to manage storage space allocation.

FIG. 4 is a schematic block diagram illustrating one embodiment of an apparatus 400 to manage storage space allocation. The apparatus 400 includes a recognizing module 402, a reserving module 404, and a managing module 406. In one embodiment, the reserving module 404 may include a pre-fetch module 408 and a requesting module 410. Additionally, the apparatus 400 may also include a reclaiming module 412, a returning module 414, and a communication module 416. In one embodiment, the apparatus 400 is stored on or coupled to the client 302.

In one embodiment, the recognizing module 402 recognizes a trigger event. Multiple embodiments of trigger events are described with reference to FIG. 5. The recognizing module 402 then interprets the trigger event as a process initiation. In one embodiment, recognizing module 402 responds to a trigger event of a predetermined signal level. Additionally, the recognizing module 402 may respond to a predetermined identifier, threshold, clock edge, or the like.

In one embodiment, the reserving module 404 reserves logical units of space to store data. The reserving module 404 may communicate with the metadata server 304 to request logical units of space in response to a file creation on the client 302. The reserving module 404 may also include a pre-fetch module 408 and a requesting module 410. In one embodiment, the pre-fetch module 408 collects logical units of space for future allocations. The pre-fetch module 408 may reserve logical units directly from the metadata server 304. Alternatively, the pre-fetch module 408 employs the requesting module 410 to request logical units from other clients 302. The pre-fetch module 408 requests logical units of space from the metadata server 304, thereby requesting access to physical units of space on the storage 306.

In one embodiment, the requesting module 410 may request logical units of space from the metadata server 304 directly. If logical units of space are not available from the metadata server 304, the metadata server 304 may request logical units of space from other clients 302 to fill the request. The requesting module 410 may also communicate directly with other clients 302 of the data storage system 300 to request available logical units of space.

In one embodiment, the managing module 406 controls the logical units of space reserved for the client 302 by the reserving module 404. Managing may include coordination of actions taken by the reclaiming module 412 and the returning module 414. Additionally, the managing module 406 may control allocation of logical units of space for data storage. In another embodiment, the managing module 406 may additionally control allocation of logical units of space to other clients 302 in response to a request from the requesting module 410 of another client 302.

In one example, a client 302 application creates a file or extends a file. The create and extend operations require an allocation of space on the SAN 306. In one embodiment, the create or extend operation is a trigger event that triggers the reserve module 404 to reserve enough data for the operation. The reserve module 404 first checks the local pool of logical units of space to determine if enough logical units are managed locally to satisfy the request. If additional logical units are required, the reserve module 404 requests them from the metadata server 304. If the metadata server 304 does not have enough unallocated logical units of space, it checks for logical units of space in other client pools. One example of a client pool of logical units of space is described in further detail with reference to FIG. 9.

In one embodiment, the other client 302 returns the logical units of space to the metadata server 304. The metadata server 304 then assigns the logical units of space to the requesting client 302. Alternatively, the clients 302 may pass logical units directly to other clients 302 and communicate the status of the logical units to the metadata server 304. If the metadata server 304 gets nothing in response from those clients 302, it returns a space allocation failure message to the requesting client 302, which may result in application failure.

In one embodiment, the reclaiming module 412 reclaims logical units of space from deleted files and reserves them for management by the client 302. For example, data stored in a database may be deleted or truncated as the data becomes obsolete. The client 302 then reclaims the storage space originally used by the deleted data for later use. Alternatively, the reclaiming module 412 may reclaim logical units of space from truncated files. The client 302 may then retain the logical units of space for local management indefinitely. Alternatively, the client 302 may retain the reclaimed logical units until a return request is received from the metadata server 304.

For example, an arbitrary application may delete or truncate a file. The reclaiming module 412 of the client 302 hosting the application may then reclaim the logical units of space associated with that file. If the client 302 already has enough logical units of space, the returning module 414 may return the logical units of space to the metadata server 304. Alternatively, the client 302 may retain the logical units of space for local management until a return request is received from the metadata server 304. In such an example, the metadata server 304 maintains a record of the state of the logical units of space. In one embodiment, the communication module 416 may communicate the state of the logical units of space to the metadata server 304.

In one embodiment, the returning module 414 returns logical units of space to the metadata server 304 for centralized management in response to a return request by the metadata server 304. In an alternative embodiment, the returning module 414 may return logical units of space to the metadata server 304 in response to passing an upper threshold for logical units of space to be retained by the client 302. In another embodiment, the returning module 414 may return substantially all logical units of space to the metadata server 304 in response to a network failure, a client 302 failure, or a metadata server 304 failure.

The metadata server 304 maintains a record of the status of each logical unit of space, as well as the status of the physical storage space. In one embodiment, the metadata server 304 stores the logical unit status information in a hash table or similar data structure. The logical unit status information may be cross-referenced with the physical space status information. Each transaction managed by the client 302 involving the logical units of space may be communicated to the metadata server 304 to ensure that the status information is accurate.

In one embodiment, the communication module 416 sends status information to the metadata server 304 for transactions involving logical units of space managed by the client 302. The communication module 416 may communicate with the metadata server 304 via a data connection 308 separate from the SAN 306 connection. Alternatively, the communication module 416 may communicate with the metadata server 304 via the SAN 306. In certain embodiments, the communication module 416 communicates information regarding storage space allocation, storage space reclamation, and the like.

Figure 5:
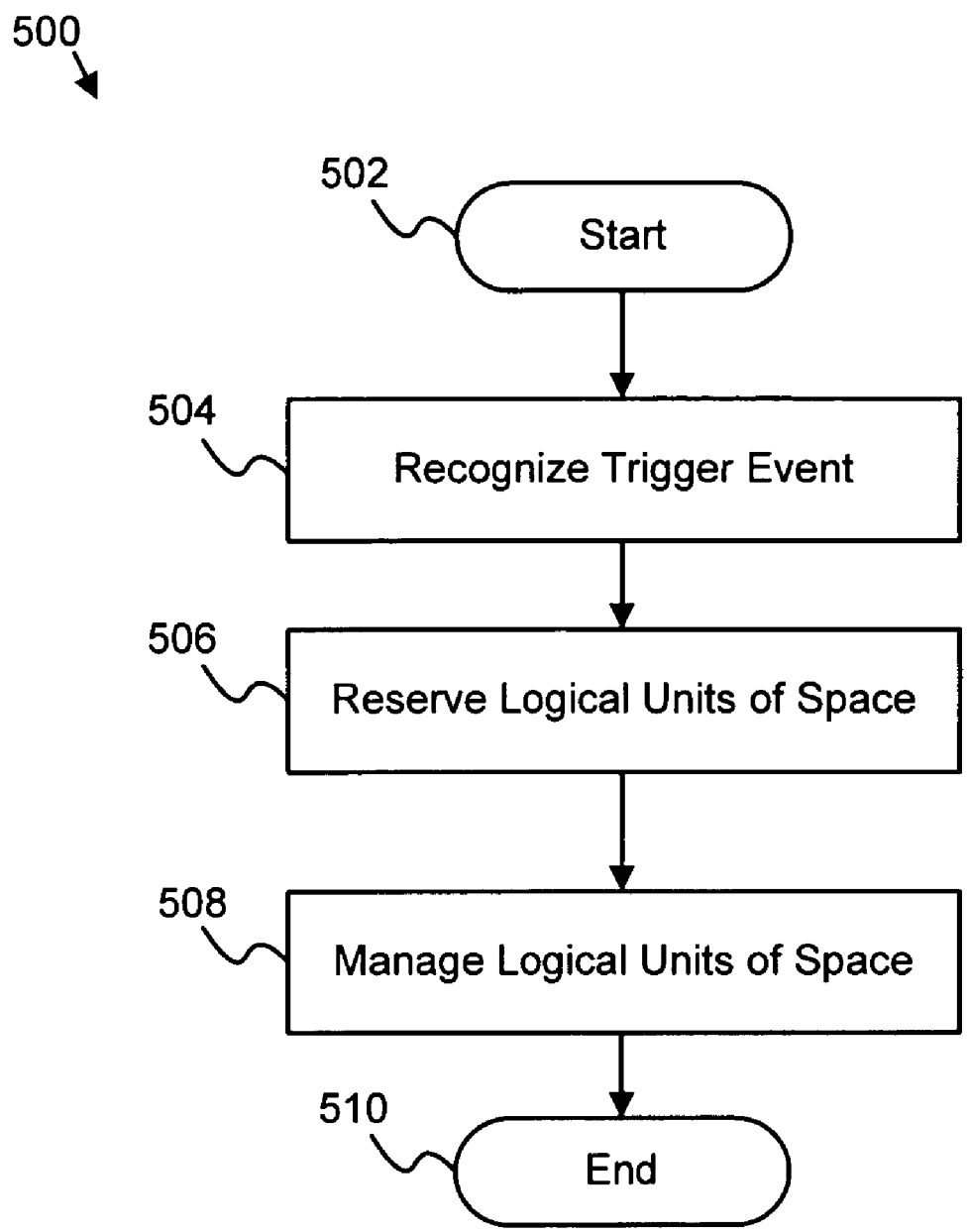
FIG. 5 is a schematic flow chart diagram illustrating one embodiment of a method for managing storage space allocation.

FIG. 5 illustrates one embodiment of a method 500 for managing storage space allocation. The method 500 starts 502 when the recognizing module 402 recognizes 504 a trigger event. In one embodiment, the reserving module 404 then reserves 506 logical units of space for the client 302. One example of the reserving operation 506 is described in more detail with reference to FIG. 6. The managing module 406 then manages 508 the logical units of space. In one embodiment, the managing module 406 continuously manages 508 the logical units of space until the metadata server 304 requests the logical units of space back from the client 302 and the method 500 ends 510. One example of the management operation 508 is described in more detail with reference to FIG. 7.

A trigger event may have multiple embodiments. In one embodiment, the recognizing module 402 recognizes 504 a system initialization as a trigger event. Alternatively, a create file request may be a trigger event. In another embodiment, a trigger event may include passing a predetermined upper or lower threshold for a pool of logical units managed 508 by the client 302. A trigger event may also include deletion of data, a scheduled indicator, an indicator sent by the metadata server 304, or the like. A trigger event may initiate actions to be taken by one of the modules of the apparatus 400. For example, the reserving module 404 may reserve 506 logical units of space in response to request to store data from a user application. Alternatively, the reserving module 404 may reserve 506 logical units of space prior to data storage requirements.

Figure 6:
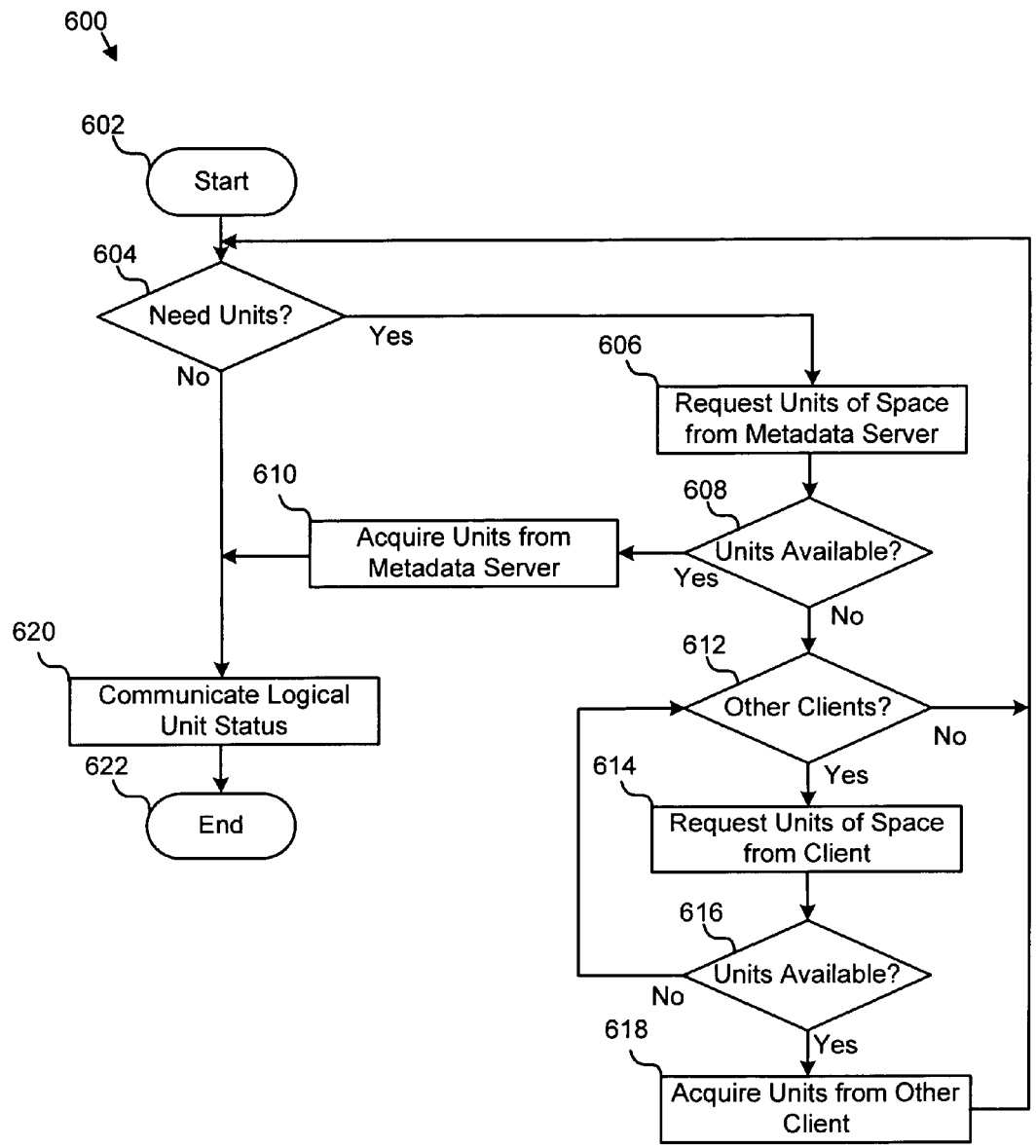
FIG. 6 is a schematic flow chart diagram illustrating one embodiment of a method for reserving a logical unit of space.

FIG. 6 illustrates one embodiment of a method 600 for reserving logical units of space. The method 600 starts 602 when a request to reserve logical units of space is received. The reserving module 404 first determines 604 if additional logical units of space need to be reserved. In certain instances, the client 302 may already hold enough logical units of space in its local pool to fill the request. If it is determined 604 that additional units of space are required, then the reserving module 404 requests 606 additional logical units of space from the metadata server 304. If the metadata server 304 has unallocated logical units of space available 608, then the reserving module 404 acquires 610 the logical units of space from the metadata server 304.

If the metadata server 304 does not have enough logical units of space available 608, then the metadata server 304 may determine 612 if any other clients 302 hold logical units of space that can be acquired 618. If other clients 302 are present 612 in the system 300, the metadata server 304 authorizes a transfer of logical units of space between clients 302, and the requesting module 410 requests 614 logical units of space from the other client 302. In one embodiment, the metadata server 304 may facilitate a transfer of logical units of space between the clients 302 by requesting that one client 302 return the logical units of space to the metadata server 304, then reissuing the logical units of space to the requesting client 302. If excess logical units of space are available 616, the reserving module 404 acquires 618 the logical units of space from the other client 302. If additional logical units are still required 604, then the method 600 continues until the required number of logical units has been reserved 506. When the required number of logical units of space is reserved or, alternatively, after acquiring a certain number of logical units of space, the communication module 416 communicates 616 the status of the logical units of space to the metadata server 304 and the method 600 ends 618.

One example where the method 600 may be implemented includes creating a file. A client 302 may receive a request to create a file from a hosted application. The client 302 first checks the local pool of logical units of space. If there are not enough logical units of space in the pool for the request, the client 302 may request logical units of space from the metadata server 304. If the metadata server 304 has insufficient logical units of space to fill the request, the metadata server 304 may request logical units of space from other clients 302. The other clients 302 then return logical units of space to the metadata server 304 and the metadata server 304 acquires the logical units of space. The metadata server 304 then sends the logical units of space to the requesting client 302 for allocation to the file. In one embodiment, the client 302 may allocate the logical unit of space to the file and communicate the status of the logical unit to the metadata server. In such an example, the client would no longer hold responsibility for management of the logical unit of space.

In another example, a client 302 may request logical units of space from the metadata server 304. If the metadata server 304 does not have logical units available, it may respond to the client 302 indicating the unavailability of logical units. The client 302 may then request logical units of space directly from other clients 302 in the system 300 and acquire logical units where available. The communication module 416 of the clients 302 involved then communicates the status of the logical units to the metadata server 304. The client 302 may then allocate the logical units of space to files, or the client 302 may hold the logical unit in a pool of logical units for further management.

Figure 7:
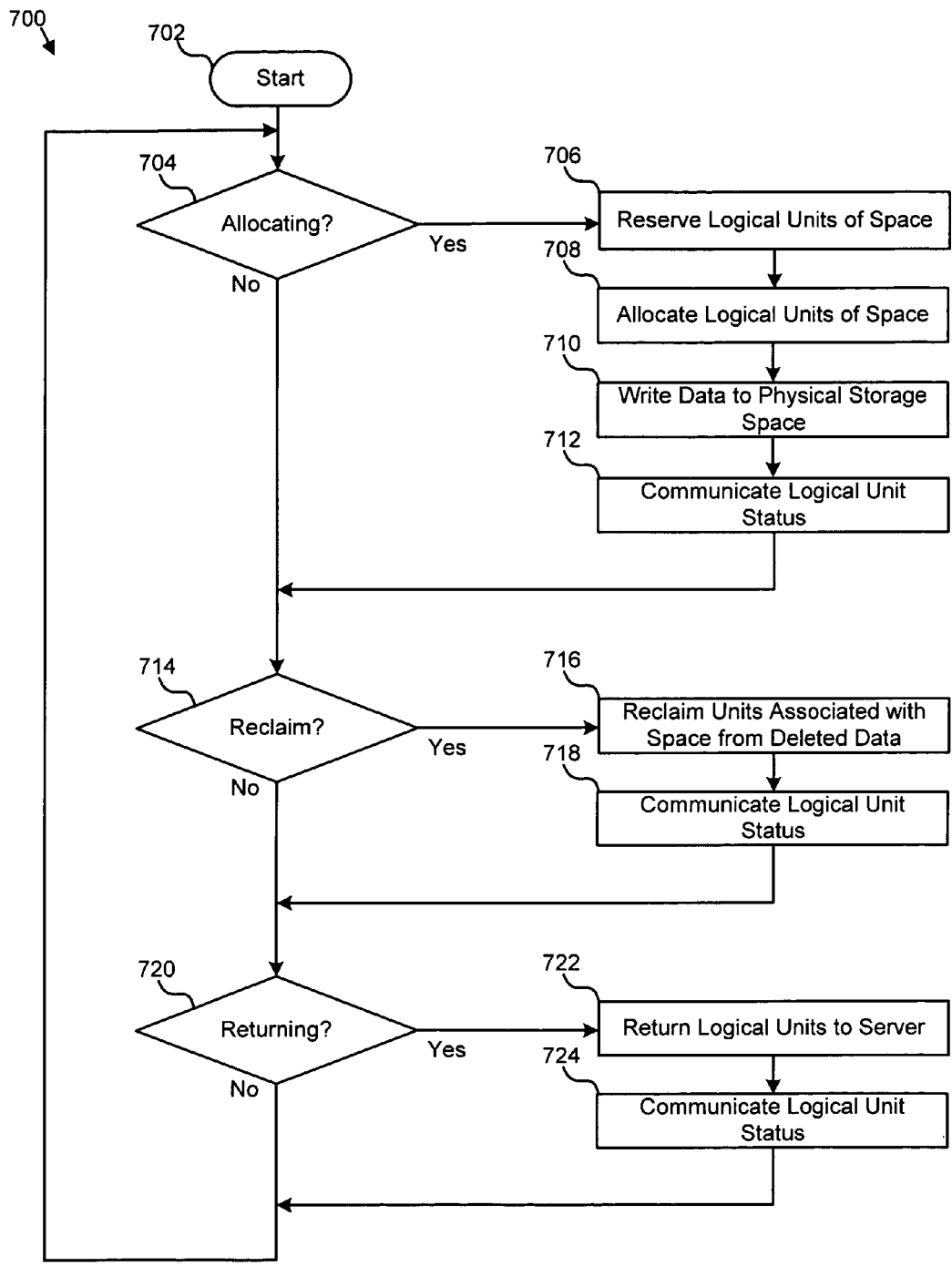
FIG. 7 is a schematic flow chart diagram illustrating one embodiment of a method for managing a logical unit of space.

FIG. 7 illustrates one embodiment of a method 700 for managing logical units of space. The method 700 starts 702 by determining 704 if any logical units of space need to be allocated for data storage. If logical units do need to be allocated 704, the reserving module 404 reserves 706 the required volume or number of logical units of space. The managing module 406 then allocates 708 the logical units of space to the data to be stored. In one embodiment, the data is then written 710 to the physical storage medium 310 and the communication module 416 communicates 712 the status of the allocated logical units of space to the metadata server 304.

If allocation is not required 704, or if allocation 708 is complete, then the managing module 406 determines 714 if data reclaiming is required. If reclaiming is required 714, then the reclaiming module 412 reclaims 716 unallocated logical units of space, which may be associated with space from deleted data. When the logical units are reclaimed 716, the communication module 416 communicates 718 the status of the logical units of space to the metadata server 304.

If reclaiming is not required 714, or if the reclaiming module 412 successfully reclaims 716 the logical units of space, then the managing module 406 determines 720 if a returning operation is required. If the metadata server 304 sends a request for the client 302 to return 722 logical units of space, then a returning operation is required 714. The returning module 414 then returns 722 the logical units of space to the metadata server 304 and the communication module 416 communicates 724 the status of the logical units of space to the metadata server 304.

Figure 8:
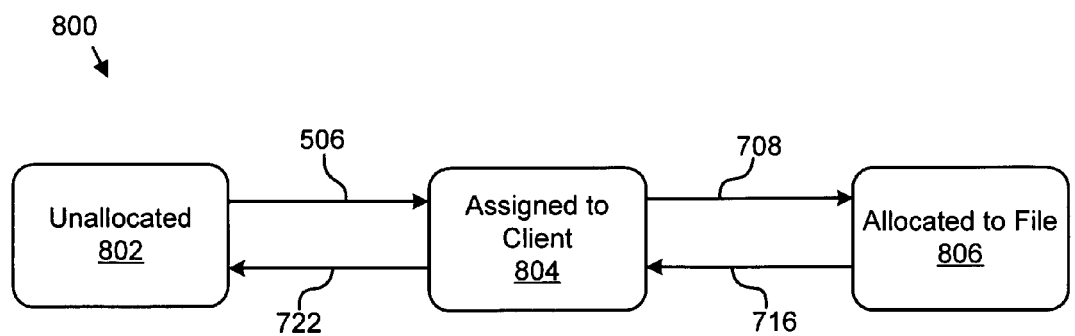
FIG. 8 is a schematic state diagram illustrating one embodiment of a life-cycle of a logical unit of space in a system to manage storage space allocation.

FIG. 8 illustrates one embodiment of the life-cycle 800 of logical units of space in a system 300 for managing storage space allocation. The states of the life-cycle 800 include unallocated 802, assigned to client ("assigned") 804, and allocated 806. Initially, the logical units of space may be unallocated 802 and held by the metadata server 304. Next, the logical units of space transition from the unallocated 802 state to the assigned 804 state when the logical units of space have been reserved by a client 302. For example, when the pre-fetch module 408 reserves logical units of space for the client 302, the logical units of space change from the unallocated state 802 to the assigned state 804. Alternatively, the logical units of space may be reserved by the client 302 when a new file is created or extended. If the managing module 406 allocates the logical units of space to a file, then the state changes to the allocated state 806. If the file is deleted or truncated, then the reclaimed logical units of space move back to the assigned state 804. In one embodiment, the client 302 that deletes the file reclaims the logical units. The logical units may then move to the allocated state 806. Alternatively, the logical units of space may move back to the unallocated state 802 if the metadata server 304 request that the client 302 return the logical units. In one embodiment, the metadata server 304 maintains a persistent record of the state of the logical units of space by receiving status communications from the clients 302 each time the logical units change state.

Figure 9:
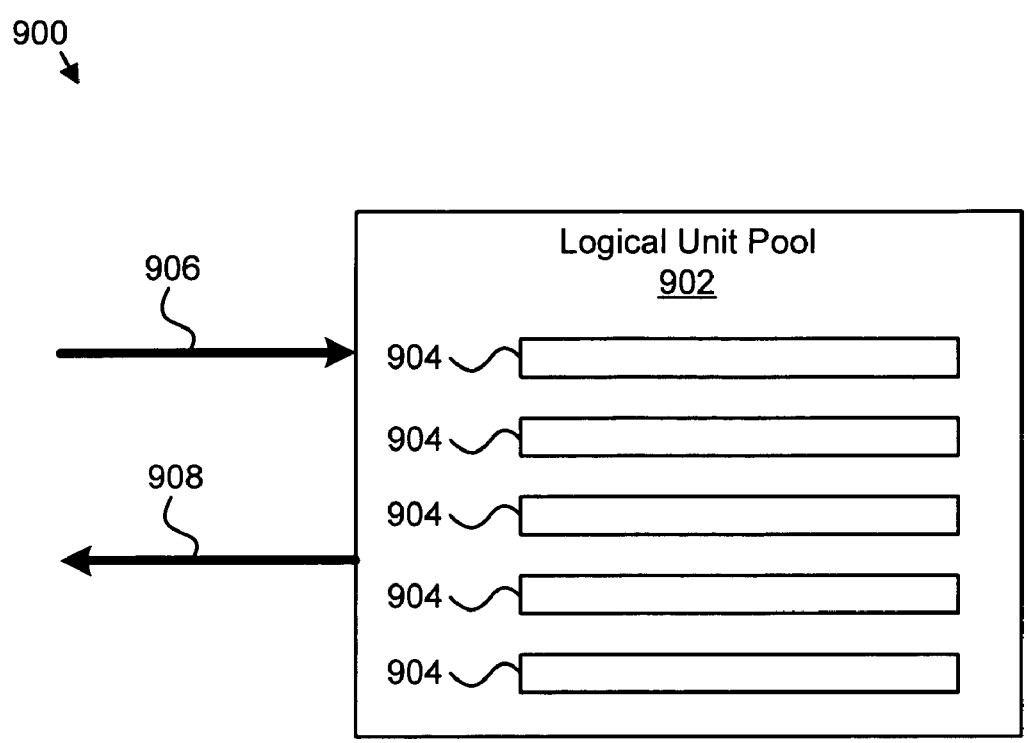
FIG. 9 is a conceptual block diagram illustrating one embodiment of the flow of logical units of space managed by a client.

FIG. 9 illustrates one embodiment of the flow 900 of logical units of space managed by a client 302. The client 302 may maintain a pool 902 of logical units 904. The pool 902 may include a group of logical units of space 904. The number of logical units of space 904 to be held in the pool 902 may be set by predetermined upper and lower thresholds. Logical units of space 904 may flow 906 into the pool 902 by reserving logical units of space 904. Reserving may include pre-fetching, requesting logical units 904 from other clients 302, acquiring logical units 904 from the metadata server 304, and/or reclaiming logical units of space 904 from deleted data.

Logical units of space 904 may flow 908 out of the pool 902 in response to allocation of logical units of space 904 to data, returning logical units of space 904 to the metadata server 304, and transferring logical units of space 904 to other clients 302. In one embodiment, logical units of space 904 may flow 908 out of the pool 902 by resetting the client pools 902 in response to a network 306 outage, a metadata server 304 outage, or a client 302 outage.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to manage storage space allocation, the apparatus comprising:

a reclaiming module configured to reclaim a logical unit of space in a storage area network (SAN) data storage system to a local pool managed by a client in response to a deletion of data without a request to a metadata server configured to allocate space and maintain a record of a status of each logical unit of space, wherein the reclaimed logical unit of space may be requested by another client;

a requesting module configured to request a logical unit of space from another client without a request to the metadata server;

a recognizing module configured to recognize a trigger event at the client, wherein the trigger event comprises passing either a predetermined upper or lower threshold for a pool of logical units;

a reserving module configured to reserve space to store data using a logical unit of the space of the plurality of logical units of space in the local pool in response to the trigger event without a request to the metadata server; and a managing module configured to manage the plurality of logical units of space at the client, wherein the managing module controls allocation of the logical units of space independently of the metadata server.

2. The apparatus of claim 1, wherein the logical unit of space managed by the client is representative of a physical unit of storage space controlled by a metadata server.

3. The apparatus of claim 1, wherein the reserving module further comprises a pre-fetch module configured to pre-fetch the logical unit of space by requesting access to a physical unit of storage space from a metadata server prior to receiving a request for space to store data.

4. The apparatus of claim 1, further comprising a communication module configured to communicate to a metadata server the state of the logical unit of space assigned to the client, thereby ensuring that logical units of space are not lost.

5. The apparatus of claim 1, further comprising a returning module configured to return the logical unit of space to a metadata server responsive to a return request from the metadata server.

6. A system to manage storage space allocation, the system comprising:
a storage in a SAN data storage system;
a metadata server configured to manage physical storage space and maintain a record of a status of each logical unit of space on the storage; and
a client coupled to the storage and the metadata server, the client configured to reclaim a logical unit space to a local pool managed by the client in response to a deletion of data without a request to the metadata server, wherein the reclaimed logical unit of space may be requested by another client, to request a logical unit of space from another client without a request to the metadata server, to recognize a trigger event at the client, wherein the trigger event comprises passing either a predetermined upper or lower threshold for a pool of logical units, to reserve space to store data using the logical units of space in the local pool in response to the trigger event without a request to the metadata server, and to manage the logical units of space, wherein the logical units of space managed by the client are associated with the physical storage space managed by the metadata server and the client controls allocation of the logical units of space independently of the metadata server.

7. The system of claim 6, wherein the client is further configured to pre-fetch the logical units of space by requesting access to the physical storage space from the metadata server prior to receiving a request for space to store data.

8. The system of claim 7, wherein the client is further configured to communicate to the metadata server the state of the logical units of space assigned to the client.

9. The system of claim 8, wherein the client is further configured to return the logical units of space to the metadata server responsive to a return request from the metadata server.

10. A computer program product comprising a computer useable medium having a computer readable program, wherein the computer readable program when executed on a computer causes the computer to:

reclaim a logical unit space in a SAN data storage system to a local pool managed by a client in response to a deletion of data without a request to a metadata server configured to allocate space and maintain a record of a status of each logical unit of space, wherein the reclaimed logical unit of space may be requested by another client;
request a logical unit of space from another client without a request to the metadata server;
recognize a trigger event at the client, wherein the trigger event comprises passing either a predetermined upper or lower threshold for a pool of logical units;
reserve space to store data using a logical unit of space of the plurality of logical units of space in the local pool in response to the trigger event without a request to the metadata server; and
manage the plurality of logical units of space at the client, allocating the logical units of space independently of the metadata server.

11. The computer program product of claim 10, wherein the logical units of space managed by the client is representative of a physical unit of storage space controlled by a metadata server.

12. The computer program product of claim 10, wherein the computer readable program is further configured to cause the computer to pre-fetch the logical unit of space by requesting a physical unit of storage space from the metadata server prior to receiving a request for space to store data.

13. The computer program product of claim 10, wherein a metadata server maintains the state of the logical unit of space assigned to the client, thereby ensuring that logical unit of space is not lost.

14. The computer program product of claim 10, wherein the computer readable program is further configured to cause the computer to return the logical unit of space to a metadata server responsive to a return request from the metadata server.

15. A client configured to manage storage space allocation, the client comprising:
a reclaiming module configured to reclaim a logical unit space in a SAN data storage system to a local pool managed by the client in response to a deletion of data without a request to a metadata server configured to allocate space and maintain a record of a status of each logical unit of space, wherein the reclaimed logical unit of space may be requested by another client;
a requesting module configured to request a logical unit of space from another client without a request to the metadata server;
a recognizing module configured to recognize a trigger event, wherein the trigger event comprises passing either a predetermined upper or lower threshold for a pool of logical units;
a reserving module configured to reserve space to store data using a logical unit of space of the plurality of logical units of space in the local pool in response to the trigger event without a request to the metadata server; and
a managing module configured to manage the logical unit of space, wherein the managing module controls allocation of the logical units of space independently of the metadata server.

* * * * *